(12) United States Patent
Tseng et al.

(10) Patent No.: US 10,591,770 B2
(45) Date of Patent: Mar. 17, 2020

(54) DISPLAY DEVICE

(71) Applicant: ASUSTeK COMPUTER INC., Taipei (TW)

(72) Inventors: Chin-An Tseng, Taipei (TW); Wen-Chang Hung, Taipei (TW); Yung-Ming Huang, Taipei (TW); Mien-Mien Cheng, Taipei (TW); Yi-Ching Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/487,452

(22) Filed: Apr. 14, 2017

(65) Prior Publication Data

US 2017/0307936 A1    Oct. 26, 2017

(30) Foreign Application Priority Data

Apr. 20, 2016  (CN) .......................... 2016 1 0248426

(51) Int. Cl.
*G02F 1/1335* (2006.01)
*G02F 1/13363* (2006.01)

(52) U.S. Cl.
CPC .... *G02F 1/133603* (2013.01); *G02F 1/13363* (2013.01); *G02F 1/133509* (2013.01); *G02F 1/133514* (2013.01); *G02F 1/133528* (2013.01); *G02F 2001/133614* (2013.01); *G02F 2001/133638* (2013.01);
(Continued)

(58) Field of Classification Search
CPC ......... G02F 1/133603; G02F 1/133514; G02F 1/133528; G02F 1/13363; G02F 1/133509; G02F 2001/133614; G02F 2001/133638; G02F 2202/36; G02F 2413/01; G02F 2413/05
USPC ........................................................ 349/106
See application file for complete search history.

(56) References Cited

U.S. PATENT DOCUMENTS 9,001,289 B2    4/2015  Fu
2011/0216271 A1*  9/2011  Suzuki ................ G02F 1/13362
                                                    349/71
2012/0287381 A1   11/2012  Li et al.
(Continued)

FOREIGN PATENT DOCUMENTS

CN       1916671       2/2007
CN       104536198      4/2015
(Continued)

OTHER PUBLICATIONS

"Office Action of China Counterpart Application", dated Jul. 31, 2019, p. 1-p. 7.

*Primary Examiner* — Charles S Chang
(74) *Attorney, Agent, or Firm* — JCIPRNET (57) ABSTRACT

A display device comprising a color filter layer and a light-emitting unit is provided. The color filter layer includes a first subpixel area, a second subpixel area and a third subpixel area. The first subpixel area includes a first quantum dot material, and the second subpixel area includes a second quantum dot material. The light-emitting unit provides light to the color filter layer. A wide color gamut and a polarization effect are achieved via the quantum dot materials and the polarization material. Furthermore, due to no additional loss of the light at the light-emitting unit (backlight module), the luminous efficiency is high.

10 Claims, 9 Drawing Sheets

(52) U.S. Cl.
CPC ...... *G02F 2202/36* (2013.01); *G02F 2413/01* (2013.01); *G02F 2413/05* (2013.01)

(56) References Cited

U.S. PATENT DOCUMENTS

| | | |
|---|---|---|
| 2013/0258253 A1 | 10/2013 | Fu |
| 2015/0185381 A1 | 7/2015 | Wu et al. |
| 2015/0228232 A1* | 8/2015 | Lee ................... G09G 3/3607 345/88 |
| 2015/0331278 A1* | 11/2015 | Araki ............... G02F 1/133617 349/61 |
| 2016/0116801 A1* | 4/2016 | Fan .................. G02F 1/133617 349/71 |
| 2016/0161650 A1* | 6/2016 | Taraschi ................... G02B 5/28 349/70 |
| 2017/0082892 A1* | 3/2017 | Chung .............. G02F 1/133514 |

FOREIGN PATENT DOCUMENTS

| | | |
|---|---|---|
| CN | 105182601 | 12/2015 |
| CN | 105259700 | 1/2016 |
| TW | 201339719 | 10/2013 |
| TW | 201341899 | 10/2013 |
| TW | 201526222 | 7/2015 |

* cited by examiner

DISPLAY DEVICE

CROSS-REFERENCE TO RELATED APPLICATION

This application claims the priority benefit of China application serial No. 201610248426.8, filed on Apr. 20, 2016. The entirety of the above-mentioned patent application is hereby incorporated by references herein and made a part of specification.

BACKGROUND OF THE INVENTION

Field of the Invention

The disclosure relates to a display device and, more specifically, to a display device with high luminous efficiency.

Description of the Related Art

Generally, quantum dots are applied in a display device to have a wide color gamut effect. The quantum dots are used to increase the color gamut. However, the loss of the luminance and power consumption is high.

BRIEF SUMMARY OF THE INVENTION

According to an aspect of the disclosure, a display device comprises: a color filter layer including a first subpixel area, a second subpixel area and a third subpixel area, wherein the first subpixel area includes a first quantum dot material, and the second subpixel area includes a second quantum dot material; and a light-emitting unit for providing light to the color filter layer.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
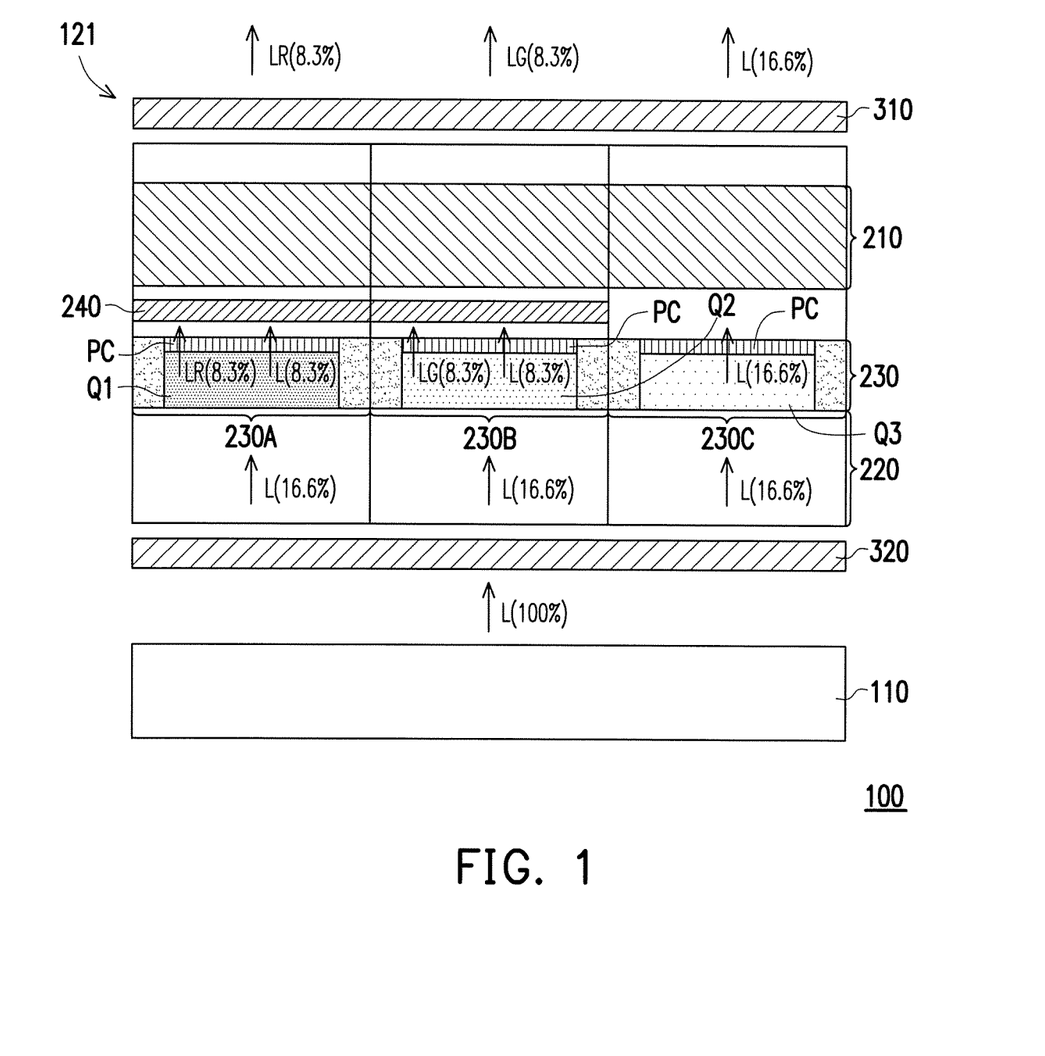
FIG. 1 is a section view of a display device in an embodiment.

Please refer to FIG. 1, in an embodiment, a display device 100 includes a light-emitting unit 110, a liquid crystal layer 210, an active component layer 220, a color filter layer 230, a first polarizer 310 and a second polarizer 320. In the embodiment, the display device 100 is a liquid crystal display device. The light-emitting unit 110 is a backlight module. A liquid crystal display panel 121 includes the liquid crystal layer 210, the active component layer 220, the color filter layer 230, the first polarizer 310 and the second polarizer 320. The light-emitting unit 110 provides light L to the liquid crystal layer 210. In the embodiment, the light L provided by the light-emitting unit 110 is blue light, which is not limited herein.

In an embodiment, the liquid crystal layer 210 is located between the color filter layer 230 and the first polarizer 310. In an embodiment, the liquid crystal molecules in the liquid crystal layer 210 rotate or switch in a horizontal electric field. In an embodiment, the liquid crystal molecules in the liquid crystal layer 210 rotate or switch in a transverse electric field, which is not limited herein.

In an embodiment, the active component layer 220 is located between the liquid crystal layer 210 and the light-emitting unit 110. The active component layer 220 includes a plurality of scan lines, a plurality of data lines and a plurality of pixel structures (not shown). In an embodiment, each of the pixel structures includes an active component and a pixel electrode (not shown). In an embodiment, the liquid crystal layer 210 is located between the active component layer 220 and the color filter layer 230.

The color filter layer 230 is located above the active component layer 220 and between the liquid crystal layer 210 and the light-emitting unit 110. The color filter layer 230 has a plurality of first subpixel areas 230A, a plurality of second subpixel areas 230B and a plurality of third subpixel areas 230C. In FIG. 1 and subsequent embodiments, only one first subpixel area 230A, one second subpixel area 230B and one third subpixel area 230C are shown.

In the embodiment, each of the first subpixel area 230A includes a first quantum dot material Q1 and a polarization material PC. Each of the second subpixel areas 230B includes a second quantum dot material Q2 and the polarization material PC. Each of the third subpixel area 230C includes a third quantum dot material Q3 and the polarization material PC. The first quantum dot material Q1, the second quantum dot material Q2 and the third quantum dot material Q3 are used for converting the light L into the light with different wavelengths and colors. In the color filter layer 230 of the embodiment, the light L is converted into red light when passing through the first quantum dot material Q1. The light L is converted into green light when passing through the second quantum dot material Q2. The light L is converted into blue light when passing through the third quantum dot material Q3. In an embodiment, the polarization material PC is photonic crystal (PC). Since the polarization material PC makes the passing-through light polarized, the light converted by the first quantum dot material Q1, the second quantum dot material Q2 and the third quantum dot material Q3 has a consistency in light polarization, such as linear polarized light.

In the embodiment, the first polarizer 310 is located above the color filter layer 230, the liquid crystal layer 210 and the active component layer 220. The second polarizer 320 is located below the color filter layer 230, the liquid crystal layer 210 and the active component layer 220. In other words, the color filter layer 230, the liquid crystal layer 210 and the active component layer 220 are located between the first polarizer 310 and the second polarizer 320.

In the embodiment in FIG. 1, the light conversion efficiency via the first quantum dot material Q1 and the second quantum dot material Q2 is not perfectly 100%. Thus, an optical filter layer 240 is configured to ensure that the unconverted light does not leak out and viewed by users. In the embodiment, the color filter layer 230 is located between the optical filter layer 240 and the light-emitting unit 110. The unconverted light L passing through the first subpixel area 230A and the second subpixel area 230B is shielded by the optical filter layer 240. In the embodiment, the light L emitting from the light-emitting unit 110 is blue light, and thus the optical filter layer 240 is a blue light filter layer. In the embodiment, since the third quantum dot material Q3 corresponds to the blue subpixel area, the optical filter layer 240 does not need to be configured above the third subpixel area 230C.

In the embodiment, it is assumed that the amount of the light L from the light-emitting unit 110 is 100%, and the percentages of the amount of the light mentioned in the following paragraphs is relative to the amount of the light L from the light-emitting unit 110. The amount of the light L is reduced by half after passing through the second polarizer 320. Therefore, after the light L passed through the second polarizer 320, the total amount of the lights L transmitted to the first subpixel area 230A, the second subpixel area 230B and the third subpixel area 230C is about 50%. Each amount of the light L received by the first subpixel area 230A, the second subpixel area 230B and the third subpixel area 230C is about 16.6%. In the embodiment, in the display device, since the light conversion efficiency of the first quantum dot material Q1 and the second quantum dot material Q2 is about 50%, half of the light L received by the first subpixel area 230A is converted into red light LR after the light L passes through the first subpixel area 230A. Thus, the amount of the red light LR is 8.3%. In the embodiment, half of the light L received by the second subpixel area 230B is converted into green light LG after the light L passes through the second subpixel area 230B. Thus, the amount of the green light LG is 8.3%. Since the light L emitted from the light-emitting unit 110 is blue light, the light L passing through the first subpixel area 230A and second subpixel area 230B but not converted into the red light LR and the green light LG is totally shielded by the blue light filter layer 240. In the embodiment, the light L is blue light and the third quantum dot material Q3 of the third subpixel area 230C is used for converting the light L into the blue light. Hence, the light L is no need to be converted by third quantum dot material Q3. That is, the amount of the blue light passing through the third subpixel area 230C is kept at 16.6%. In an embodiment, the third subpixel area 230C is configured without the third quantum dot material Q3.

In FIG. 1, in the embodiment, the total amount of the outputting light (adding the amount of the light from each subpixel area) from the display device 100 is 33%. Therefore, the total amount of the outputting light from the display device 100 is double that of a conventional display device (of which the total amount of the outputting light from the conventional display device is 16.5% of the light emitted from the light-emitting unit of the conventional display device). In the embodiment, the quantum dot materials are applied in the color filter layer 230 to have a wide color gamut effect. The polarization material is applied in the color filter layer 230 to polarize the light. The luminous efficiency is improved due to reduce loss of the light.

In the embodiment, the liquid crystal display panel 121 is configured by referring to the display device 100 in FIG. 1. The liquid crystal display panel 121 is adapted to cooperate with the light L from the light-emitting unit 110 (backlight module) for display.

Figure 2:
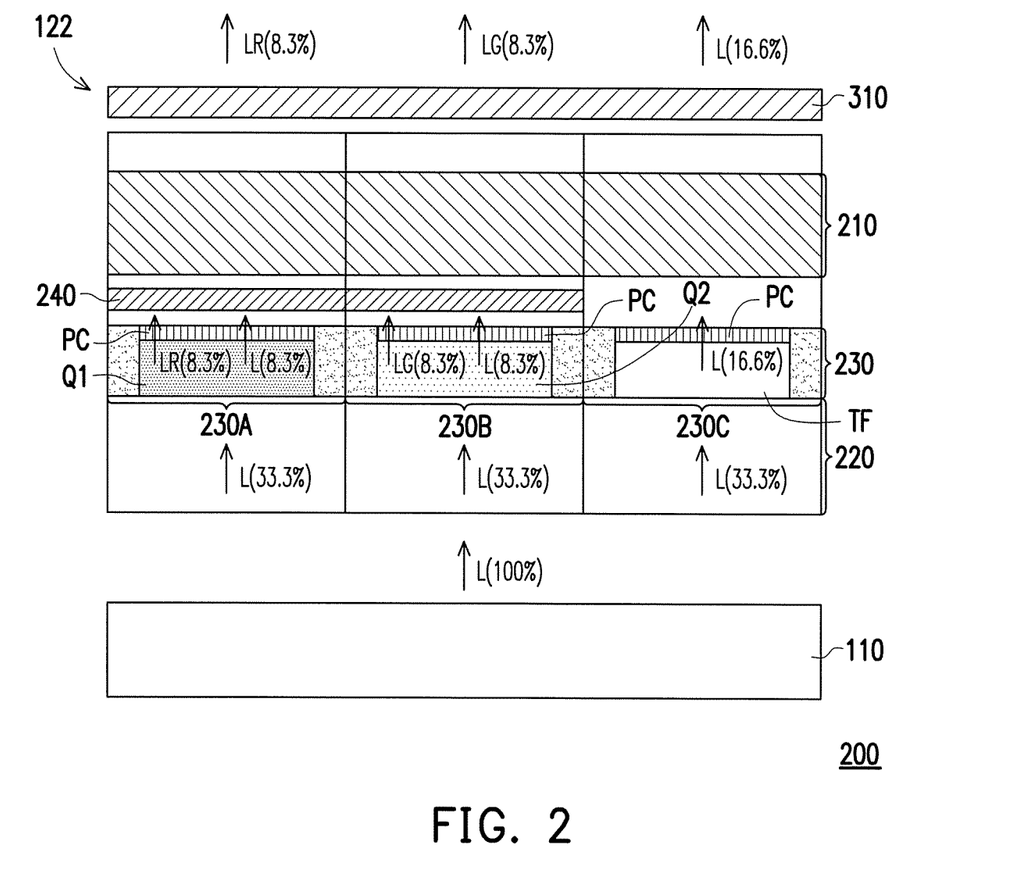
FIG. 2 is a section view of a display device in an embodiment.

FIG. 2 is a section view of a display device in an embodiment. A display device 200 in FIG. 2 is similar to the display device 100 in FIG. 1. In the embodiment, the display device 100 is a liquid crystal display device. The light-emitting unit 110 is a backlight module. The same/similar component is denoted by the same/similar reference symbol. In FIG. 2, a transparent color filter TF substitutes for the third quantum dot material Q3 of FIG. 1 to be used in the third subpixel area 230C. In the embodiment, a liquid crystal display panel 122 includes the liquid crystal layer 210, the active component layer 220, the color filter layer 230 and the first polarizer 310. In FIG. 2, in the embodiment, since the light L from the light-emitting unit 110 is blue light, the third quantum dot material Q3 for converting the light L into blue light is omitted. In FIG. 2, in the embodiment, since the polarization material PC is configured in the color filter layer 230 to polarize the light, the second polarizer 320 below the color filter layer 230 is omitted. In the embodiment, without the configuration of the second polarizer 320, each amount of the light L received by the first subpixel area 230A, the second subpixel area 230B and the third subpixel area 230C is 33.3%.

In the embodiment, after the light L passes through the polarization material PC, the amount of the light L is reduced by half and the light conversion efficiency of the first quantum dot material Q1 and the second quantum dot material Q2 are both about 50%. In other words, in the embodiment, the amount of the light L converted into the red light LR is 8.3%, and the amount of the light L converted into the green light LG is 8.3%. In the embodiment, the amount of the light L passed through the third subpixel area 230C is reduced to 16.6% due to the polarization material PC of the third subpixel area 230C. In the embodiment, since the transparent color filter TF is used in the third subpixel area 230C, the light L is not converted when passing through the third subpixel area 230C. That is, the amount of the blue light is kept at 16.6%. Therefore, the total amount of the outputting light (adding the amount of the light from each subpixel area) from the display device 200 is 33%. That is, the total amount of the outputting light from the display device 200 is double that of a conventional display device (of which the total amount of the outputting light from the light-emitting unit of the conventional display device is 16.5%).

In an embodiment, the liquid crystal display panel 122 is configured by referring to the display device 200 in FIG. 2. The liquid crystal display panel 122 is adapted to cooperate with the light L from the light-emitting unit 110 (in an embodiment, a backlight module) for display.

Figure 3:
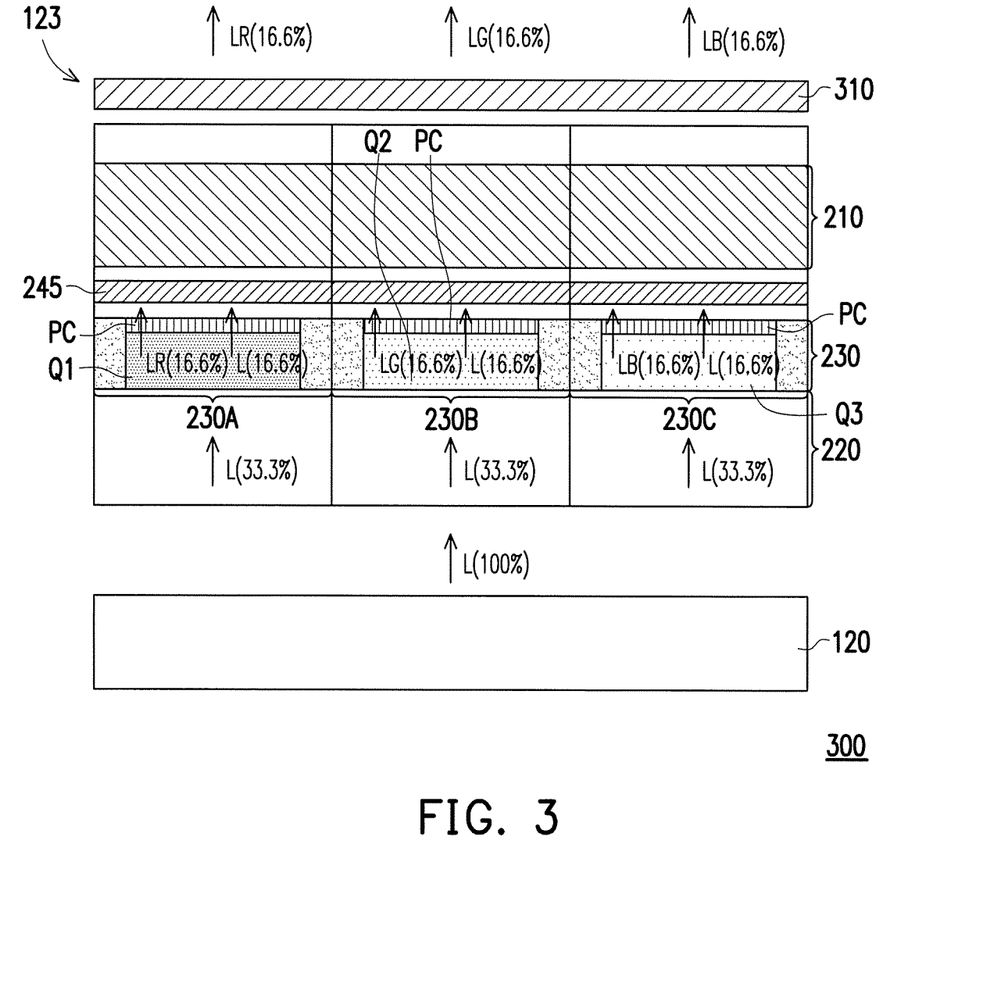
FIG. 3 is a section view of a display device in an embodiment.

FIG. 3 is a section view of a display device in an embodiment. A display device 300 in FIG. 3 is similar to the display device 100 in FIG. 1. In the embodiment, the display device 300 is a liquid crystal display device. The light-emitting unit 120 is a backlight module. Other same/similar component is denoted by the same/similar reference symbol. However, the light L from the light-emitting unit 120 (backlight module) of the display device 300 in FIG. 3 is ultraviolet light not blue light. In the embodiment, a liquid crystal display panel 123 includes the liquid crystal layer 210, the active component layer 220, the color filter layer 230 and the first polarizer 310.

In the embodiment, since the ultraviolet light is used as the backlight, an ultraviolet light filter layer 245 is applied to shield the ultraviolet light. In the embodiment, the ultraviolet light filter layer 245 is configured to the first subpixel area 230A, the second subpixel area 230B and the third subpixel area 230C, respectively. Therefore, the ultraviolet light unconverted to other light is shielded effectively.

In FIG. 3, since the polarization material PC is configured in the color filter layer 230 to polarize the light, the display device 300 is configured without the second polarizer 320, and the amount of each of the light L received by the first subpixel area 230A, the second subpixel area 230B and the third subpixel area 230C is about 33.3%. In the embodiment, the light conversion efficiency of the first quantum dot material Q1, the second quantum dot material Q2 and the third quantum dot material Q3 are both about 50%. Therefore, the amount of each of the light L converted into the red light LR, the green light LG and the blue light LB is 16.6%. Hence, the total amount of the outputting light from the display device 300 is about 50%.

In an embodiment, the liquid crystal display panel 123 is configured by referring to the display device 300 in FIG. 3. The liquid crystal display panel 123 is adapted to cooperate with the light L emitting from the light-emitting unit (backlight module) 120 for display.

Figure 4:
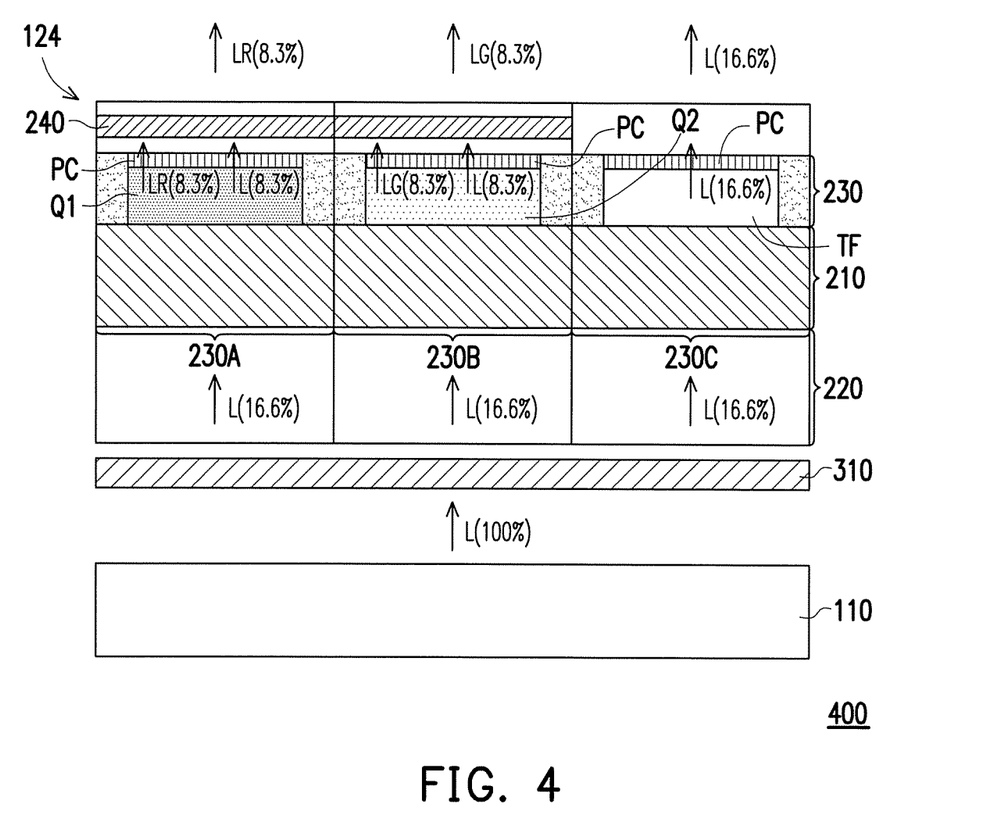
FIG. 4 is a section view of a display device in an embodiment.

FIG. 4 is a section view of a display device in an embodiment. The display device 400 in FIG. 4 is similar to the display device 200 in FIG. 2. In the embodiment, the display device 400 is a liquid crystal display device. The light-emitting unit 110 is a backlight module. The same/similar component is denoted by the same/similar reference symbol. In FIG. 4, in the embodiment, the liquid crystal layer 210 is located between the color filter layer 230 and the active component layer 220. The first polarizer 310 is located between the liquid crystal layer 210 and the light-emitting unit 110. In other words, the first polarizer 310 is a bottom polarizer for the display device 400. In the embodiment, a liquid crystal display panel 124 includes the liquid crystal layer 210, the active component layer 220, the color filter layer 230 and the first polarizer 310.

In the embodiment, since the polarization material PC is configured in the color filter layer 230, and the color filter layer 230 is located above the liquid crystal layer 210 and the first polarizer 310, the light is polarized via the polarization material PC. In the embodiment, with such a configuration, the amount of the light L that has passed through the first polarizer 310 is reduced to 16.6%. Therefore, the total amount of the lights received by the first subpixel area 230A, the second subpixel area 230B and the third subpixel area 230C is reduced to about 50%.

The light conversion efficiency of the first quantum dot material Q1 of the first subpixel area 230A and the second quantum dot material Q2 of the second subpixel area 230B are both about 50%. Therefore, after passing through the first subpixel area 230A and the second subpixel area 230B, the amount of the light L is converted into the red light LR and the green light LG are both about 8.3%. In the embodiment, since the light L emitting from the light-emitting unit 110 is blue light, the light L unconverted into the red light LR and the green light LG in the first subpixel area 230A and the second subpixel area 230B is shielded by the blue optical filter layer 240. In the embodiment, since a transparent color filter TF is used in the third subpixel area 230, the light L is unconverted to other light when passing through the third subpixel area 230. That is, the amount of the blue light is kept at 16.6%. Therefore, the total amount of the outputting light from the display device 400 is about 33%.

In an embodiment, the liquid crystal display panel 124 is configured by referring to the display device 400 in FIG. 4. The liquid crystal display panel 124 is adapted to cooperate with the light L from the light-emitting unit 110 (backlight module) for display.

Figure 5:
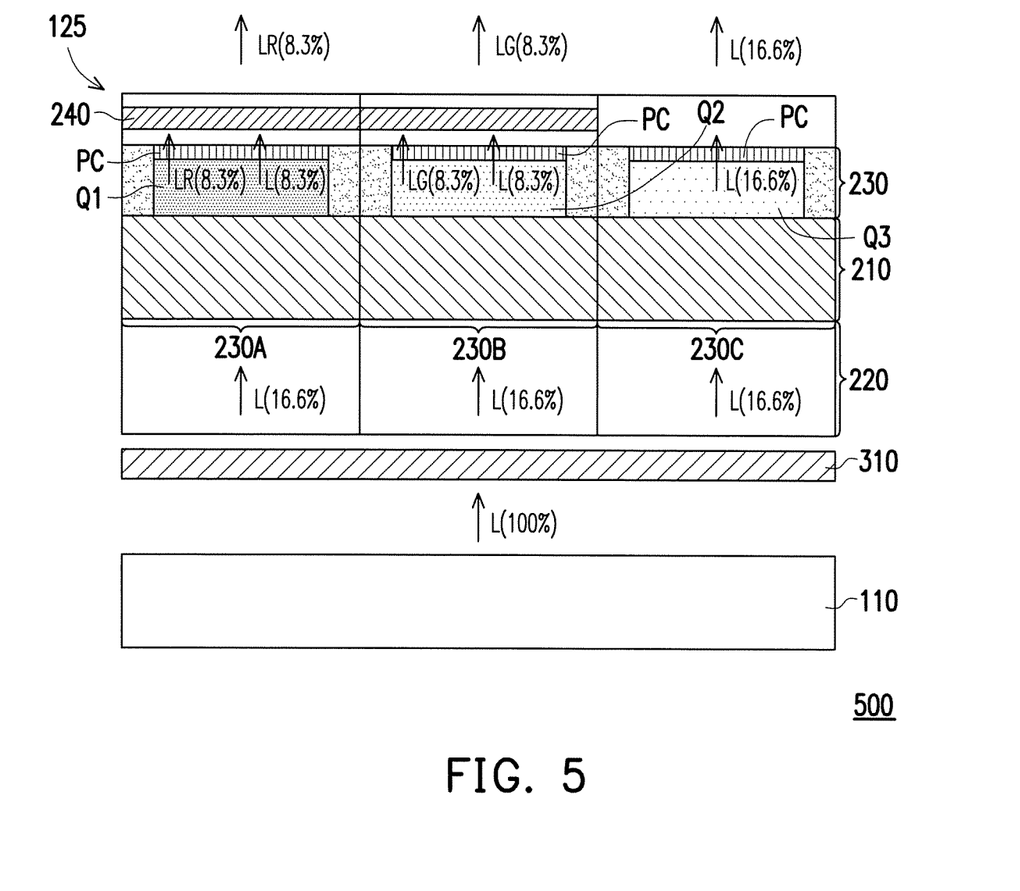
FIG. 5 is a section view of a display device in an embodiment.

FIG. 5 is a section view of a display device in an embodiment. A display device 500 in FIG. 5 is similar to the display device 100 in FIG. 1. In the embodiment, the display device 500 is a liquid crystal display device. The light-emitting unit 110 is a backlight module. The same/similar component is denoted by the same/similar reference symbol. In FIG. 5, in the embodiment, the liquid crystal layer 210 is located between the color filter layer 230 and the active component layer 220. The first polarizer 310 is located between the liquid crystal layer 210 and the light-emitting unit 110 (backlight module). In other words, the first polarizer 310 is a bottom polarizer for the display device. In the embodiment, a liquid crystal display panel 125 includes the liquid crystal layer 210, the active component layer 220, the color filter layer 230 and the first polarizer 310.

In the embodiment, since the polarization material PC is configured in the color filter layer 230 and the color filter layer 230 is located above the liquid crystal layer 210 and the first polarizer 310, the light is polarized via the polarization material PC. In the embodiment, with such a configuration, the amount of the light L has passed through the first polarizer 310 is reduced to 16.6%, therefore the total amount of the lights received by the first subpixel area 230A, the second subpixel area 230B and the third subpixel area 230C is reduced to about 50%.

The light conversion efficiency of the first quantum dot material Q1 of the first subpixel area 230A and the second quantum dot material Q2 of the second subpixel area 230B are both about 50%. Therefore, after passing through the first subpixel area 230A and the second subpixel area 230B, half of the light L is converted into the red light LR and the green light LG, respectively. Thus, the amount of the red light LR is 8.3% and the amount of the green light LG is 8.3%. In the embodiment, since the light L emitting from the light-emitting unit 110 is blue light, the light L unconverted into the red light LR and the green light LG in the first subpixel area 230A and the second subpixel area 230B is shielded by the blue light filter layer 240. In the embodiment, since the light L is blue light and the third quantum dot material Q3 of the third subpixel area 230C is used for converting the light L into the blue light, the light L passing through the third subpixel area 230C is no need to be converted. Therefore, the amount of the blue light is kept at 16.6%. Thus, in the embodiment, the total amount of outputting light from the display device 500 is about 33%.

In the embodiment, the liquid crystal display panel 125 is configured by referring to the display device 500 in FIG. 5. The liquid crystal display panel 125 is adapted to cooperate with the light L from the light-emitting unit 110 (backlight module) for display.

Figure 6:
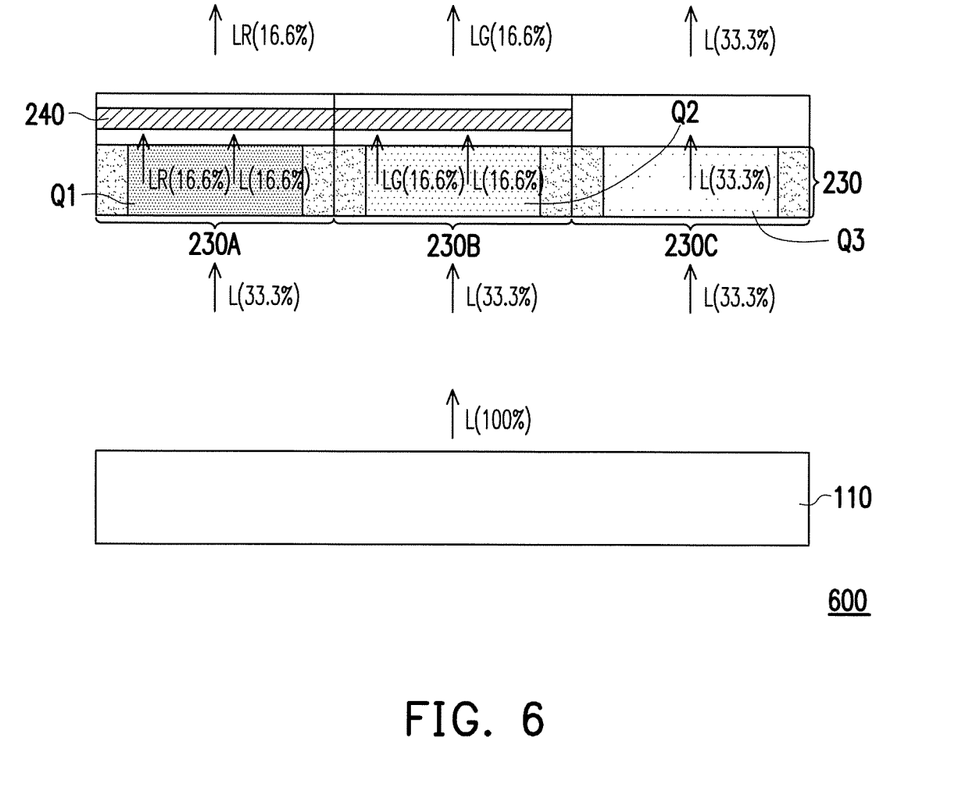
FIG. 6 is a section view of a display device in an embodiment.

FIG. 6 is a section view of a display device in an embodiment. In the embodiment, a display device 600 in FIG. 6 includes the light-emitting unit 110 and the color filter layer 230. Since the light-emitting unit 110 in FIG. 6 is an organic light emitting diode (OLED), a liquid crystal layer or a polarizer is saved. The light-emitting unit 110 provides the light L to the color filter layer 230. In the embodiment, the light L emitted from the light-emitting unit 110 is blue light, which is not limited herein.

In FIG. 6, in the embodiment, the active component is integrated in the light-emitting unit 110. The color filter layer 230 is located above the light-emitting unit 110. The color filter layer 230 includes a plurality of the first subpixel areas 230A, a plurality of the second subpixel areas 230B and a plurality of the third subpixel areas 230C. In FIG. 6 and subsequent embodiments, only one first subpixel area 230A, one second subpixel area 230B and one third subpixel area 230C are shown.

In the embodiment, each of the first subpixel areas 230A includes the first quantum dot material Q1. Each of the second subpixel areas 230B includes the second quantum dot material Q2. Each of the third subpixel areas 230C includes the third quantum dot material Q3. Details for the first quantum dot material Q1, the second quantum dot material Q2 and the third quantum dot material Q3 can refer to the descriptions of those in FIG. 1, which is not described herein. In FIG. 6, in the embodiment, the light conversion efficiency via the first quantum dot material Q1 and the second quantum dot material Q2 is not perfectly 100%. Thus, the optical filter layer 240 is configured to avoid that the unconverted light leak out and viewed by the users.

In the embodiment, the color filter layer 230 is located between the optical filter layer 240 and the light-emitting unit 110. The unconverted light L that has passed through the first subpixel areas 230A and the second subpixel areas 230B is shielded by the optical filter layer 240. In the embodiment, the light L from the light-emitting unit 110 is blue light, and the optical filter layer 240 is a blue light filter layer and configured above the first subpixel areas 230A and the second subpixel areas 230B. In addition, since the third subpixel area 230C is the blue subpixel area, the optical filter layer 240 is saved.

In the embodiment, it is assumed that the amount of the light L provided by the light-emitting unit 110 is 100%, and the percentages of the amount of the light mentioned in the following paragraphing is relative to the amount of the light L from the light-emitting unit 110. The amount of each of the light L received by the first subpixel area 230A, the second subpixel area 230B and the third subpixel area 230C is 33.3%. In the embodiment, each of the light conversion efficiency of the first quantum dot material Q1, the second quantum dot material Q2 and the third quantum dot material Q3 is about 50%. Therefore, the amount of the light L converted into the red light LR and the green light LG are both 16.6%. In the embodiment, since the light L is blue light and the third quantum dot material Q3 of the third subpixel area 230C is used for converting the light L into the blue light, the light L does not need to be converted when passing through the third subpixel area 230C. That is, the amount of the blue light from the third subpixel area 230C is kept at 33.3%. Therefore, the amount of the outputting light from the display device 600 is about 66.6%.

Figure 7:
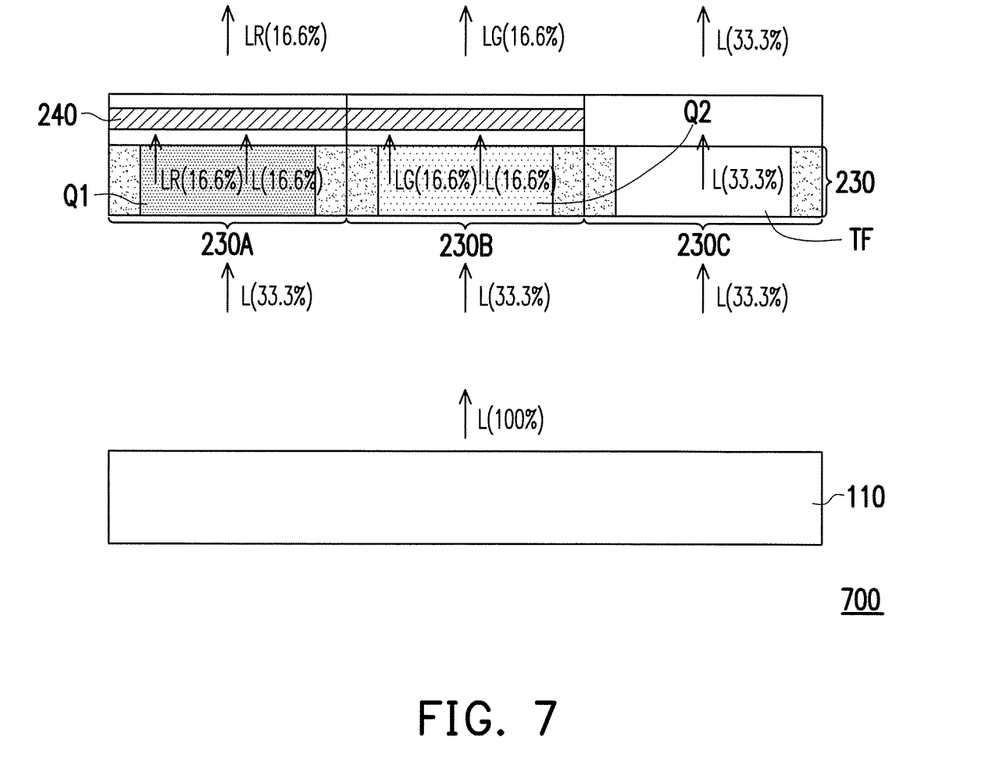
FIG. 7 is a section view of a display device in an embodiment.

FIG. 7 is a section view of a display device in an embodiment. A display device 700 in FIG. 7 is similar to the display device 600 in FIG. 6. In FIG. 7, in the embodiment, the light-emitting unit 110 is an organic light emitting diode (OLED), and the active component is integrated in the light-emitting unit 110. The same/similar component is denoted by the same/similar reference symbol. In FIG. 7, a transparent color filter TF substitutes the third quantum dot material Q3 of FIG. 6 and used in the third subpixel area 230C.

In the embodiment, it is assumed that the amount of the light L provided by the light-emitting unit 110 is 100%, the amount of each of the light L received by the first subpixel area 230A, the second subpixel area 230B and the third subpixel area 230C is 33.3%, respectively. In the embodiment, the light conversion efficiency of the first quantum dot material Q1 and the second quantum dot material Q2 are both about 50%. Therefore, the amount of the light L converted into the red light LR and the green light LG are both 16.6%. In the embodiment, since the transparent color filter TF is used in the third subpixel area 230C, the light L is not converted when passing through the third subpixel area 230C. That is, the amount of the blue light from the third subpixel area 230C is kept at 33.3%. Therefore, the amount of the outputting light out of the display device 700 is about 66.6%.

Figure 8:
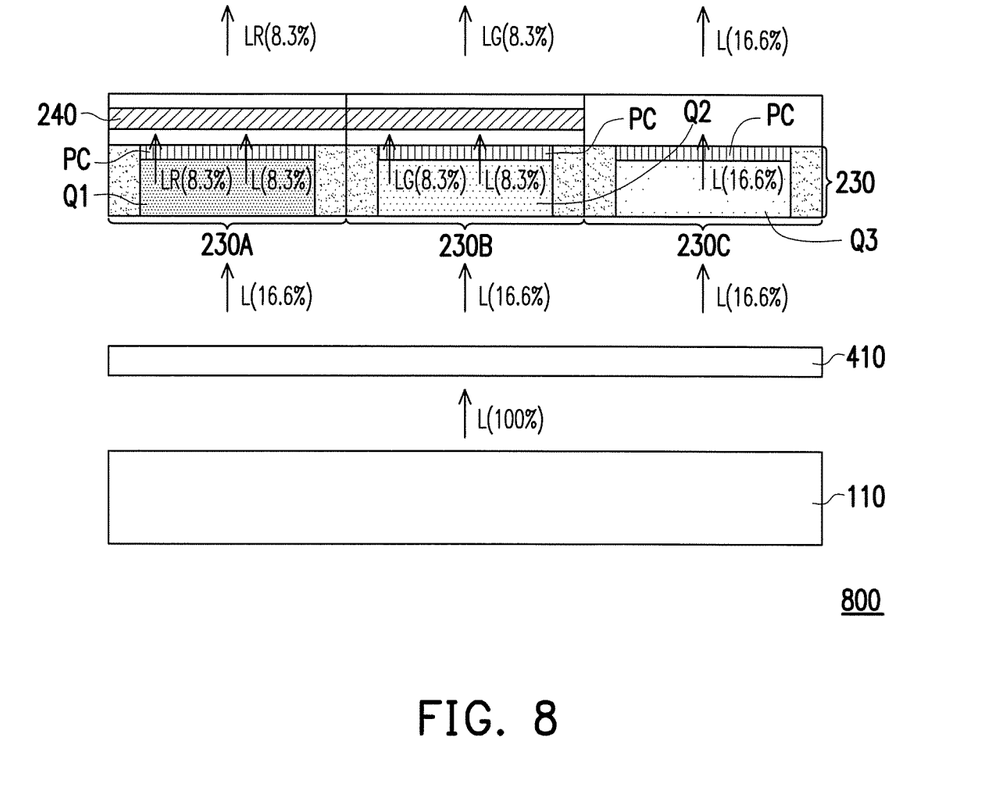
FIG. 8 is a section view of a display device in an embodiment.

FIG. 8 is a section view of a display device in an embodiment. A display device 800 in FIG. 8 is similar to the display device 600 in FIG. 6. In FIG. 8, in the embodiment, the light-emitting unit 110 is an organic light emitting diode (OLED), and the active component is integrated in the light-emitting unit 110. The same/similar component is denoted by the same/similar reference symbol. In FIG. 8, the first subpixel area 230A, the second subpixel area 230B and the third subpixel area 230C further include the polarization material PC. In an embodiment, the polarization material PC is photonic crystal (PC). The polarization material PC is used to polarize the light passing through it. Thus the light has a consistence in light polarization (such as linear polarized light) after passing through the first quantum dot material Q1, the second quantum dot material Q2 or the third quantum dot material Q3. In FIG. 8, in the embodiment, since the polarization material PC has a linear polarization characteristic, a quarter-wave phase delay film 410 is configured between the light-emitting unit 110 (OLED) and the color filter layer 230 to achieve an anti-reflection effect.

With such a configuration, the amount of each of the light L received by the first subpixel area 230A, the second subpixel area 230B and the third subpixel area 230C is about 33.3%, respectively. The amount of the light is reduced to 16.6% after passing through the quarter-wave phase delay film 410. In addition, the light conversion efficiency of the first quantum dot material Q1 and the second quantum dot material Q2 are both about 50%. Therefore, the amount of the light L converted into the red light LR and the green light LG are both 8.3%. In the embodiment, since the light L is blue light and the third quantum dot material Q3 of the third subpixel area 230C is used for converting the light L into the blue light, the light L does not need to be converted when passing through the third subpixel area 230C. That is, the amount of the blue light from the third subpixel area 230C is kept at 16.6%. Therefore, the amount of the outputting light out of the display device 800 is about 33.3%.

Figure 9:
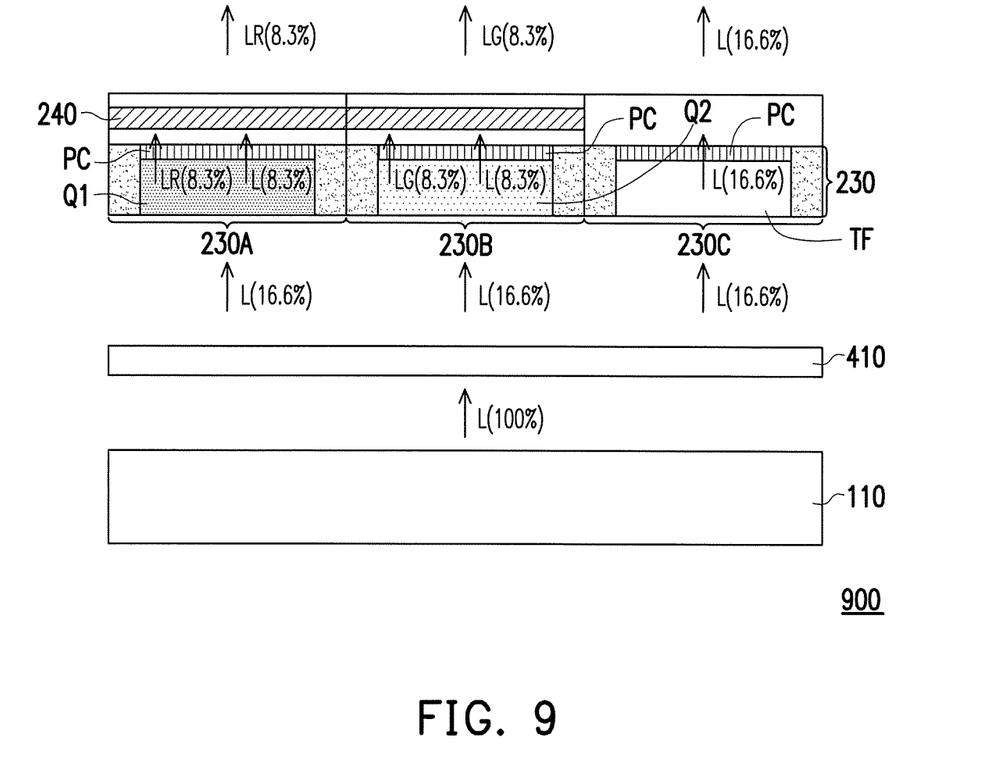
FIG. 9 is a section view of a display device in an embodiment.

FIG. 9 is a section view of a display device in an embodiment. A display device 900 in FIG. 9 is similar to the display device 800 in FIG. 8. In FIG. 9, in the embodiment, the light-emitting unit 110 is an organic light emitting diode, and the active component is integrated in the light-emitting unit 110. The same/similar component is denoted by the same/similar reference symbol. In FIG. 9, a transparent color filter TF substitutes for the third quantum dot material Q3 of FIG. 8 to be used in the third subpixel area 230C.

With such a configuration, the amount of each of the light L received by the first subpixel area 230A, the second subpixel area 230B and the third subpixel area 230C is about 33.3%. The amount of the light L is reduced to 16.6% after passing through the quarter-wave phase delay film 410. In addition, the light conversion efficiency of the first quantum dot material Q1 and the second quantum dot material Q2 are both about 50%. Therefore, the amount of the light L converted into the red light LR and the green light LG are both 8.3%. In the embodiment, since the transparent color filter TF is used in the third subpixel area 230, the light L is not converted when passing through the third subpixel area 230. That is, the amount of the blue light from the third subpixel area 230C is kept at 16.6%. Therefore, in the embodiment, the amount of the outputting light out of the display device 900 is about 33.3%.

In the embodiments, since the quantum dot materials and the polarization material are configured in the color filter layer, a wide color gamut and a polarization effect are achieved. Due to no additional loss of the light at the light-emitting unit (such as the backlight module), the luminous efficiency is increased. In the embodiments, since the polarization material polarize the light passing through it, the amount of the polarizer layer configured in the display can be reduced, and the cost is thus reduced.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A display device comprising:
a color filter layer including a first subpixel area, a second subpixel area and a third subpixel area, wherein the first subpixel area includes a first quantum dot material, the second subpixel area includes a second quantum dot material, and the third subpixel area includes a third quantum dot material, and each of the first subpixel area, the second subpixel area and the third subpixel area further includes a polarization material layer directly disposed on the first quantum dot material, the second quantum dot material, and the third quantum dot material, respectively, wherein the polarization material layer is for polarizing a passing-through light, and wherein in each of the subpixel areas, each of the respective quantum dot materials and the polarization material layer are two separate layers;
a light-emitting unit for providing light to the color filter layer, wherein the light-emitting unit is a backlight module;
a first polarizer; and
a liquid crystal layer, wherein the liquid crystal layer is located between the color filter layer and the first polarizer,
wherein the first quantum dot material, the second quantum dot material and the third quantum dot material are located between the liquid crystal layer and the polarization material layer.

2. The display device according to claim 1, wherein the third subpixel area further includes a third quantum dot material.

3. The display device according to claim 2, wherein the first quantum dot material, the second quantum dot material and the third quantum dot material are used for converting the light into red light, green light and blue light, respectively.

4. The display device according to claim 1, wherein the display device further includes an optical filter layer, the color filter layer is located between the optical filter layer and the light-emitting unit, and the optical filter layer is configured to shield the light that passes through the first subpixel area and the second subpixel area.

5. The display device according to claim 1, wherein the first polarizer is located between the liquid crystal layer and the backlight module.

6. The display device according to claim 1, wherein the color filter layer is located between the liquid crystal layer and the backlight module.

7. The display device according to claim 1, wherein the light-emitting unit is an organic light emitting diode.

8. The display device according to claim 7, further comprising a quarter-wave phase delay film located between the organic light emitting diode and the color filter layer.

9. A display device comprising:
a color filter layer including a first subpixel area, a second subpixel area and a third subpixel area, wherein the first subpixel area includes a first quantum dot material, the second subpixel area includes a second quantum dot material, and the third subpixel area includes a third quantum dot material, and each of the first subpixel area, the second subpixel area and the third subpixel area further includes a polarization material layer directly disposed on the first quantum dot material, the second quantum dot material, and the third quantum dot material, respectively, wherein the polarization material layer is for polarizing a passing-through light, and wherein in each of the subpixel areas, each of the respective quantum dot materials and the polarization material layer are two separate layers;
a light-emitting unit for providing light to the color filter layer, wherein the light-emitting unit is a backlight module;
an optical filter layer, the color filter layer is located between the optical filter layer and the light-emitting unit, and the optical filter layer is configured to shield the light that passes through the first subpixel area and the second subpixel area;
a first polarizer;
a liquid crystal layer, wherein the liquid crystal layer is located between the color filter layer and the first polarizer; and
a second polarizer, wherein the color filter layer and the liquid crystal layer are located between the first polarizer and the second polarizer, and the second polarizer is located between the color filter layer and the backlight module;
wherein the first quantum dot material, the second quantum dot material and the third quantum dot material are located between the liquid crystal layer and the polarization material layer.

10. A display device comprising:
a color filter layer including a first subpixel area, a second subpixel area and a third subpixel area, wherein the first subpixel area includes a first quantum dot material, and the second subpixel area includes a second quantum dot material, and each of the first subpixel area, the second subpixel area and the third subpixel area further includes a polarization material layer, wherein in the first subpixel area and the second subpixel area, the polarization material layer directly disposed on the first quantum dot material, and the second quantum dot material, respectively, wherein the polarization material layer is for polarizing a passing-through light, and wherein in the first subpixel area and the second subpixel area, each of the respective quantum dot materials and the polarization material layer are two separate layers;
a light-emitting unit for providing light to the color filter layer, wherein the light emitting unit is a backlight module;
a first polarizer; and
a liquid crystal layer, wherein the first polarizer is located between the liquid crystal layer and the backlight module, and the liquid crystal layer is located between the color filter layer and the first polarizer,
wherein the first quantum dot material and the second quantum dot material are located between the liquid crystal layer and the polarization material layer.

* * * * *